(12) United States Patent
Nakanishi et al.

(10) Patent No.: US 11,459,036 B2
(45) Date of Patent: Oct. 4, 2022

(54) VEHICLE BODY FRONT STRUCTURE

(71) Applicant: HONDA MOTOR CO., LTD., Tokyo (JP)

(72) Inventors: Yukinobu Nakanishi, Wako (JP); Daisuke Ebihara, Wako (JP); Seiichi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 546 days.

(21) Appl. No.: 16/560,494

(22) Filed: Sep. 4, 2019

(65) Prior Publication Data

US 2020/0102018 A1 Apr. 2, 2020

(30) Foreign Application Priority Data

Sep. 27, 2018 (JP) .............................. JP2018-181346

(51) Int. Cl.
*B62D 25/12* (2006.01)
*B60L 53/16* (2019.01)
(Continued)

(52) U.S. Cl.
CPC .............. *B62D 25/12* (2013.01); *B60L 53/16* (2019.02); *H01R 13/5202* (2013.01);
(Continued)

(58) Field of Classification Search
CPC .......... H01R 13/52502; H01R 13/5213; H01R 13/512; H01R 2201/26
(Continued)

(56) References Cited

U.S. PATENT DOCUMENTS 7,677,631 B1 * 3/2010 Zischke ................. B60K 15/05
180/69.24
8,720,968 B2 * 5/2014 Zalan ..................... B60L 53/16
296/97.22
(Continued)

FOREIGN PATENT DOCUMENTS

CN 101752621 A 6/2010
CN 202827796 U 3/2013
(Continued)

OTHER PUBLICATIONS

2nd Notification of Office Action for Patent Application CN 201910905519.7 dated Apr. 24, 2022; 16 pp.
(Continued)

*Primary Examiner* — Alexander Gilman
(74) *Attorney, Agent, or Firm* — Armstrong Teasdale LLP

(57) ABSTRACT

Provided is a vehicle body front structure including a front hood (7) provided in a front part of a vehicle body (3), and a port device (30) mounted to the vehicle body and positioned under the front hood. The front hood includes an outer panel (7A) and an inner panel (7B) attached to a back side of the outer panel, the outer panel and the inner panel defining a port opening (21) facing the port device and passed through the outer panel and the inner panel in a thicknesswise direction thereof, and being welded to each other along a peripheral edge (22) of the port opening, and a garnish (23) is provided on an outer surface of a peripheral part of the outer panel surrounding the port opening, and a lid (58) for selectively closing the port opening is provided on the vehicle body.

6 Claims, 11 Drawing Sheets

(51) Int. Cl.
*H01R 13/52* (2006.01)
*H01R 13/512* (2006.01)

(52) U.S. Cl.
CPC ..... *H01R 13/5213* (2013.01); *H01R 13/5227* (2013.01); *H01R 13/512* (2013.01); *H01R 2201/26* (2013.01)

(58) Field of Classification Search
USPC .......................................................... 296/193
See application file for complete search history.

(56) References Cited

U.S. PATENT DOCUMENTS

| | | | | |
|---|---|---|---|---|
| 8,816,815 | B2* | 8/2014 | Kuramochi | B60L 53/16 439/304 |
| 8,827,358 | B2* | 9/2014 | Rocheblave | B62D 25/12 296/193.11 |
| 8,853,996 | B2* | 10/2014 | Sekido | B60L 53/16 320/109 |
| 9,139,102 | B2* | 9/2015 | DeBoer | B60L 53/14 |
| 9,845,115 | B2* | 12/2017 | Farooq | B62D 25/12 |
| 9,889,890 | B1* | 2/2018 | Manginen | B60R 21/34 |
| 10,155,546 | B2* | 12/2018 | Kashima | B62D 25/12 |
| 10,443,277 | B2* | 10/2019 | Basavarajappa | E05B 83/34 |
| 11,104,238 | B2* | 8/2021 | Nakanishi | B60Q 1/28 |
| 11,325,486 | B2* | 5/2022 | Nakanishi | B62D 25/105 |
| 2009/0195031 | A1* | 8/2009 | Ishitobi | B60R 21/34 296/193.11 |
| 2011/0285165 | A1* | 11/2011 | Baba | B60K 15/05 296/97.22 |
| 2013/0106142 | A1* | 5/2013 | Yonezawa | B60R 21/34 296/193.11 |
| 2013/0157485 | A1* | 6/2013 | Yamamaru | B60K 15/04 174/67 |
| 2014/0062142 | A1* | 3/2014 | Ikeda | B62D 25/12 296/193.11 |
| 2015/0191093 | A1* | 7/2015 | Yamamaru | B60L 53/16 320/109 |
| 2015/0291123 | A1* | 10/2015 | Yoshida | B62D 25/105 296/193.11 |
| 2016/0087375 | A1* | 3/2016 | Yoshizawa | B60L 53/18 439/345 |
| 2016/0152280 | A1* | 6/2016 | Inoue | B60R 21/34 296/193.11 |
| 2016/0375747 | A1* | 12/2016 | Kawashima | B60J 5/101 49/475.1 |
| 2017/0225615 | A1* | 8/2017 | Salter | B60Q 1/50 |
| 2017/0241191 | A1* | 8/2017 | Farooq | B62D 25/10 |
| 2017/0274937 | A1* | 9/2017 | Hammer | B60R 21/34 |
| 2017/0282978 | A1* | 10/2017 | Yoshida | B62D 25/105 |
| 2019/0368240 | A1* | 12/2019 | Stack | E05C 19/022 |
| 2020/0101852 | A1* | 4/2020 | Hatami | B62D 25/12 |
| 2020/0101853 | A1* | 4/2020 | Nakanishi | B60L 53/16 |
| 2020/0101854 | A1* | 4/2020 | Nakanishi | B60K 15/05 |
| 2020/0102018 | A1* | 4/2020 | Nakanishi | B62D 25/12 |
| 2020/0105074 | A1* | 4/2020 | Fukuda | B60K 15/05 |
| 2020/0324646 | A1* | 10/2020 | Herczeg | B60K 15/05 |
| 2021/0016670 | A1* | 1/2021 | Yamanouchi | B60R 19/48 |

FOREIGN PATENT DOCUMENTS

| | | |
|---|---|---|
| CN | 203199048 U | 9/2013 |
| CN | 103847533 A | 6/2014 |
| CN | 204432792 U | 7/2015 |
| CN | 105735789 A | 7/2016 |
| CN | 107054212 A | 8/2017 |
| EP | 2740624 A1 | 6/2014 |
| JP | 2006182149 A | 7/2006 |
| JP | 2014112997 A | 6/2014 |

OTHER PUBLICATIONS

First Notification of Office Action for Patent Application CN 201910905519.7 dated Oct. 26, 2021; 15 pp.

* cited by examiner

VEHICLE BODY FRONT STRUCTURE

TECHNICAL FIELD

The present invention relates to a vehicle body front structure having a port device which may include a charging port, a power feeding port and/or a fuel port, for instance.

BACKGROUND ART

In the field of electric vehicles, it is known to provide a port device including a charging port in a front hood of the vehicle. See JP2014-112997A. The front hood typically includes an outer panel and an inner panel attached to each other. The port device is positioned in a housing fixedly secured to the inner panel. This prior patent publication also discloses an arrangement in which a housing is attached to the vehicle body, and an opening is formed in the front hood to allow access to the port device, but fails to disclose any details regarding how a favorable external appearance can be ensured or how a sealing arrangement can be provided.

By supporting the housing of the port device by the vehicle body so that the port device may face an opening formed in the front hood, a charging cable or a power feeding cable can be connected to the port device with ease. Typically, a lid is provided on an upper open end of the housing to selectively provide an access to the port device.

However, when the port device is provided on the front hood, the weight of the front hood increases, and this adds to the effort required to open and close the front hood. When the port device is supported by the vehicle body, and the front hood is provided with an opening to allow access to the port device, the stiffness of the front hood may be impaired, and the external appearance of the front hood may be impaired.

SUMMARY OF THE INVENTION

In view of such a problem of the prior art, a primary object of the present invention is to provide a vehicle body front structure which allows a port device to be mounted to a vehicle body, and permits access to the port device via an opening formed in the front hood without impairing the stiffness of the front hood, and without impairing the external appearance of the front hood.

To achieve such an object, one embodiment of the present invention provides a vehicle body front structure (1) including a front hood (7) provided in a front part of a vehicle body (3), and a port device (30) mounted to the vehicle body and positioned under the front hood; wherein the front hood includes an outer panel (7A) and an inner panel (7B) attached to a back side of the outer panel, the outer panel and the inner panel defining a port opening (21) facing the port device and passed through the outer panel and the inner panel in a thicknesswise direction thereof, and being welded to each other along a peripheral edge (22) of the port opening; and wherein a garnish (23) is provided on an outer surface of a peripheral part of the outer panel surrounding the port opening, and a lid (58) for selectively closing the port opening is provided on the vehicle body.

Since the port device is mounted to the vehicle body instead of the front hood, the weight of the front hood is not increased by the presence of the port device. Since the outer panel and the inner panel are welded to each other along the peripheral edge of the port opening, the stiffness of the front hood is not reduced owing to the presence of the port opening. The garnish conceals the weld seam or the weld spots from external view so that the external appearance of the front panel is not impaired.

Preferably, the vehicle body is provided with a housing (36) having an open side facing the port opening, the port device being received in the housing, and the lid includes a lid plate (59) for selectively closing the port opening, and a hinge arm (61) extending from the lid plate into the housing and supported by the housing so as to be rotatable around a laterally extending hinge axis.

Since the hinge axis of the lid is positioned inside the housing, when the lid is in the closed position, a part of the lid is received in the housing. Thereby, the amount of protrusion of the lid from the upper surface of the front hood when the lid is in the open position can be minimized. Therefore, when the vehicle is traveling with the lid in the open position, the load applied to the lid by the wind can be minimized.

Preferably, the lid is configured to move from a closed position to an open position by a rearward rotation of the lid plate, and a rear part of the housing is provided with a lid receiving recess (38) which is recessed more downward than a front part of the housing and configured to receive at least a part of the lid in the open position, Thereby, a large part of the lid can be received in the housing when the lid is in the open position.

Preferably, the lid plate has a smaller lateral width in a front part thereof than in a rear part thereof.

Thereby, the lid is prevented from interfering with the peripheral edge of the port opening or the garnish as the lid is rotated between the open position and the closed position.

Preferably, the housing includes a front wall (36A) extending laterally in front of the port device, and a pair of side walls (36C) extending rearward from either side edge of the front wall along either side of the port device, and wherein a front edge and side edges of the lid plate are fitted with a first seal member (64A) that projects downward therefrom so as to engage the front wall and the side walls when the lid is in the closed position.

Thereby, the port device is protected from the intrusion of moisture and other foreign matters.

Preferably, the garnish is provided with a flange portion (27) projecting beyond the peripheral edge of the port opening in a part of the garnish corresponding to a rear edge of the port opening, and a rear edge of the lid plate is fitted with a second seal member (64B) that projects downward and under the flange portion so as to overlap with the flange portion as viewed from above when the lid is in the closed position.

Thus, a labyrinth seal is formed by the flange portion of the garnish and the second seal member so that the intrusion of moisture and other foreign matters into the housing is prevented. Since the second seal member includes a part extending under the flange portion of the garnish, the second seal member does not interfere with the flange portion of the garnish when the lid rotates between the closed position and the open position.

Preferably, the first seal member and the second seal member are continuous to each other.

Thereby, the seal structure for the lid can be simplified.

Preferably, the rear edge of the lid plate coincides with a part of the lid receiving recess as viewed from above when the lid is closed.

Thereby, the moisture such as rainwater that may pass through the gap between the rear edge of the lid plate and the garnish can be collected in the lid receiving recess, and can be kept away from the port device.

Preferably, a bottom part of the lid receiving recess is formed with a drain hole (90) passed through a bottom wall of the lid receiving recess in a thicknesswise direction.

Thereby, moisture such as rainwater that is collected in the lid receiving recess can be discharged to the outside.

The present invention thus provides a vehicle body front structure which allows a port device to be mounted to a vehicle body, and permits access to the port device via an opening formed in the front hood without impairing the stiffness of the front hood, and without impairing the external appearance of the front hood.

BRIEF DESCRIPTION OF THE DRAWING(S)

DESCRIPTION OF THE PREFERRED EMBODIMENT(S)

A vehicle body front structure according to an embodiment of the present invention is described in the following. The vehicle to which the vehicle body front structure of this embodiment is applied may be an electric vehicle or a plug-in hybrid vehicle.

Figure 1:
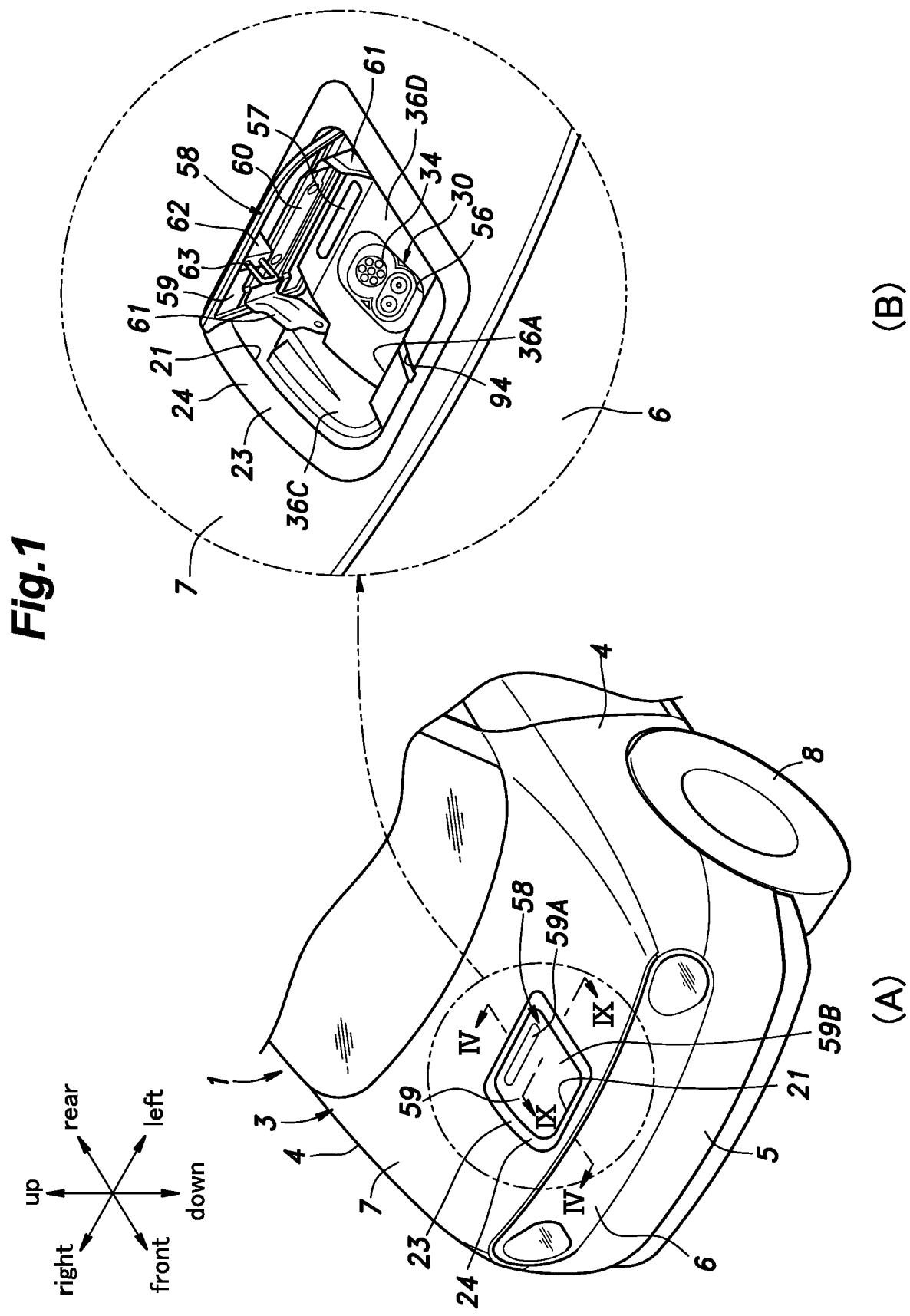
FIG. 1 is a perspective view of a vehicle body front structure according to an embodiment of the present invention showing a lid in a closed position in (A) and in an open position in (B)

As shown in FIG. 1, the vehicle body front structure 1 is a part of a vehicle body 3 that defines a cabin and a front space 2 located in front of the cabin. The vehicle body 3 includes a pair of fenders 4 that define the left and right sides of the front space 2, a front bumper face 5 and a front grille 6 that define the front end of the front space 2, a dashboard panel (not shown in the drawings) that separates the rear end of the front space 2 and the front end of the cabin from each other, and an under cover (not shown in the drawings) that delimits the lower end of the front space 2. The upper opening of the front space 2 can be selectively closed by a front hood 7.

The front hood 7 is connected to the dashboard panel by hinges (not shown in the drawings) at the lateral ends of the rear part thereof, and is supported by the dashboard panel so as to be rotatable about a hinge axis extending laterally. Thus, the front hood 7 can selectively close the upper open end of the front space 2. The front wheels 8 are provided on either side of the front space 2.

Figure 2:
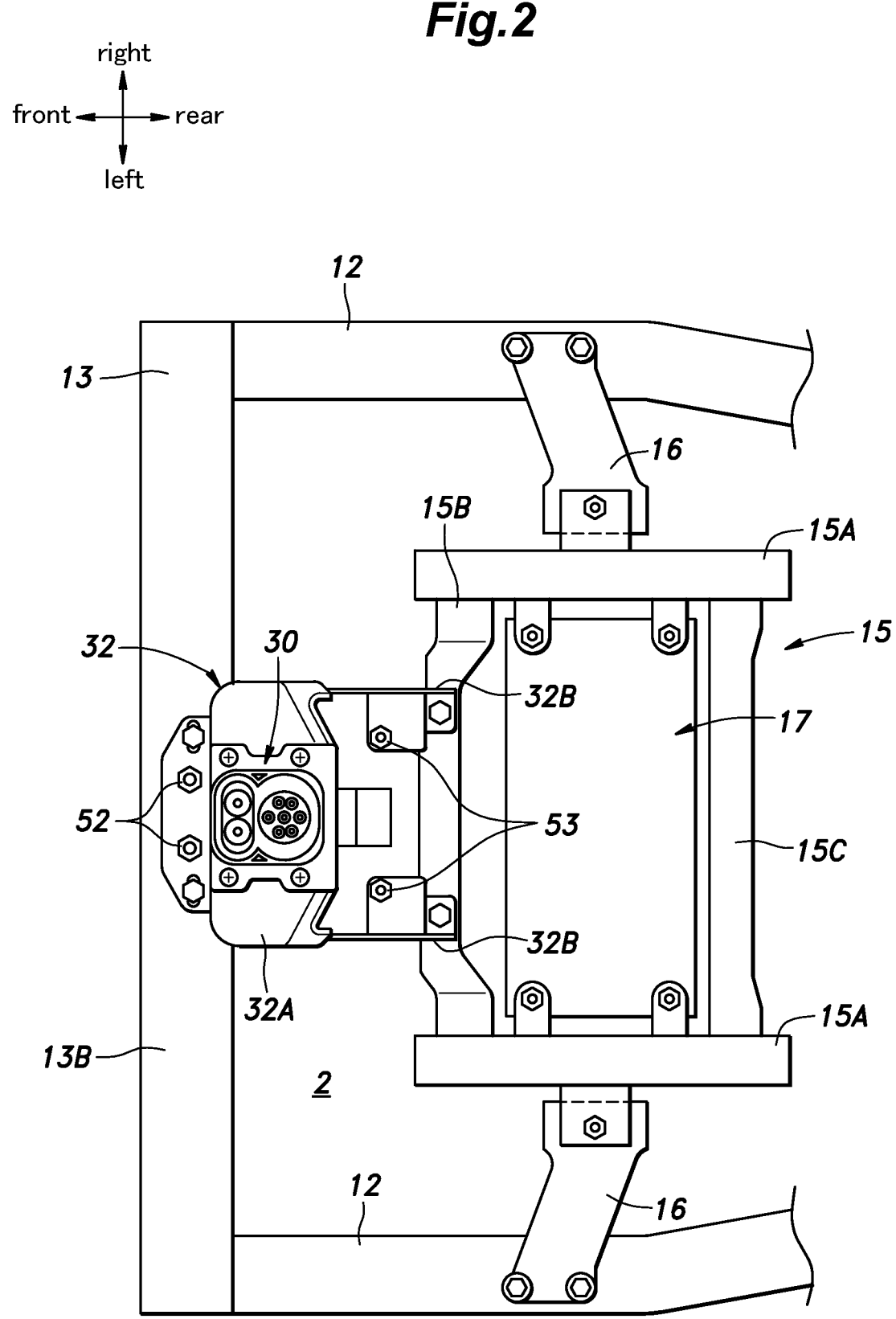
FIG. 2 is a plan view of the vehicle body front structure.

As shown in FIG. 2, the vehicle body 3 includes a pair of front side members 12 extending in the fore and aft direction along either side of a lower part of the front space 2 and a bulkhead 13 connected between the front ends of the front side members 12. The bulkhead 13 consists of a rectangular frame including a pair of vertical members 13A connected to the front side members 12, respectively, an upper member 13B connected between the upper ends of the vertical members 13A, and a lower member (not shown in the drawings) connected between the lower ends of the vertical members 13A. A radiator (not shown in the drawings) for cooling electric equipment is positioned under the upper member 13B.

Figure 3:
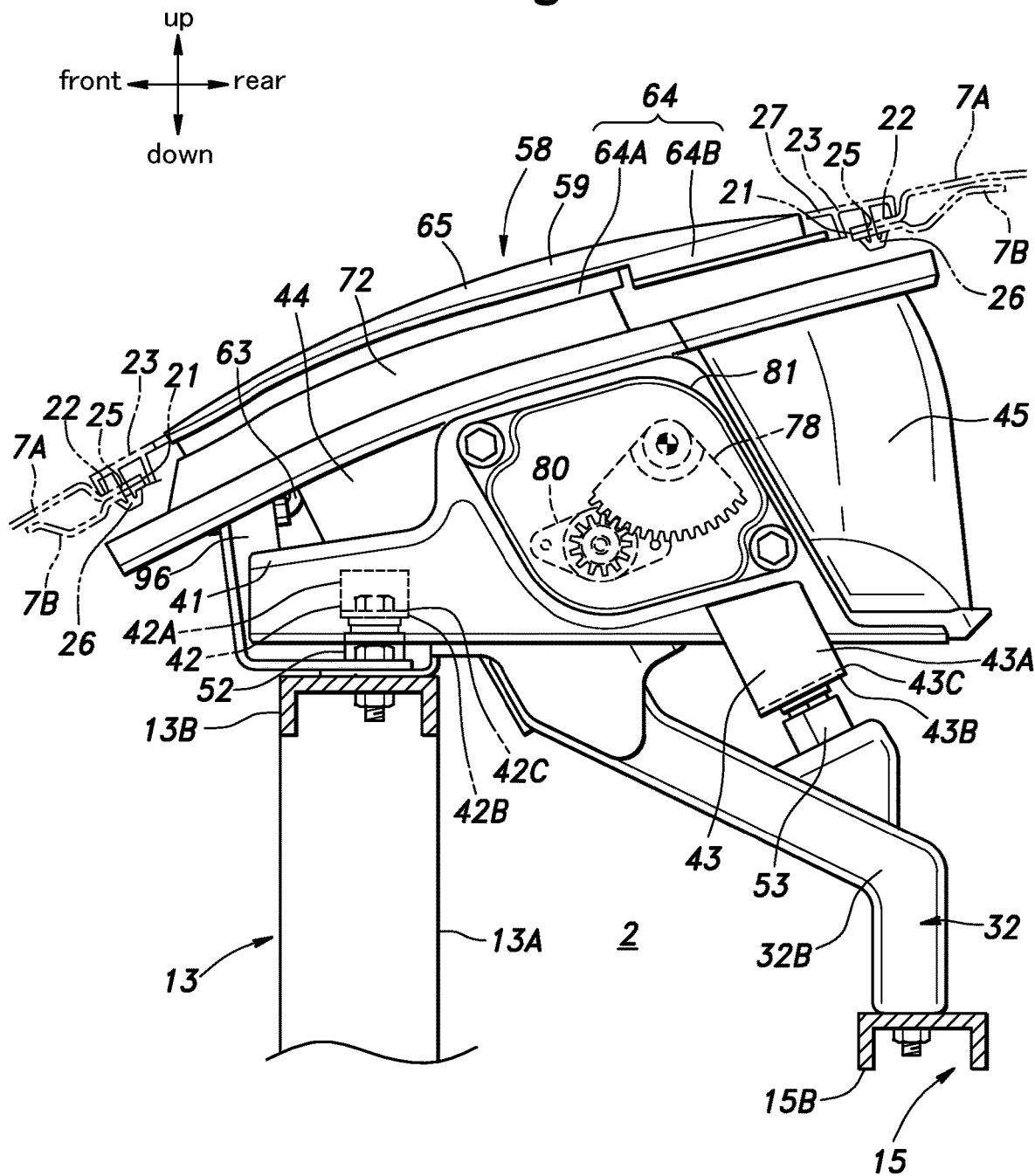
FIG. 3 is a side view of the vehicle body front structure.
Figure 4:
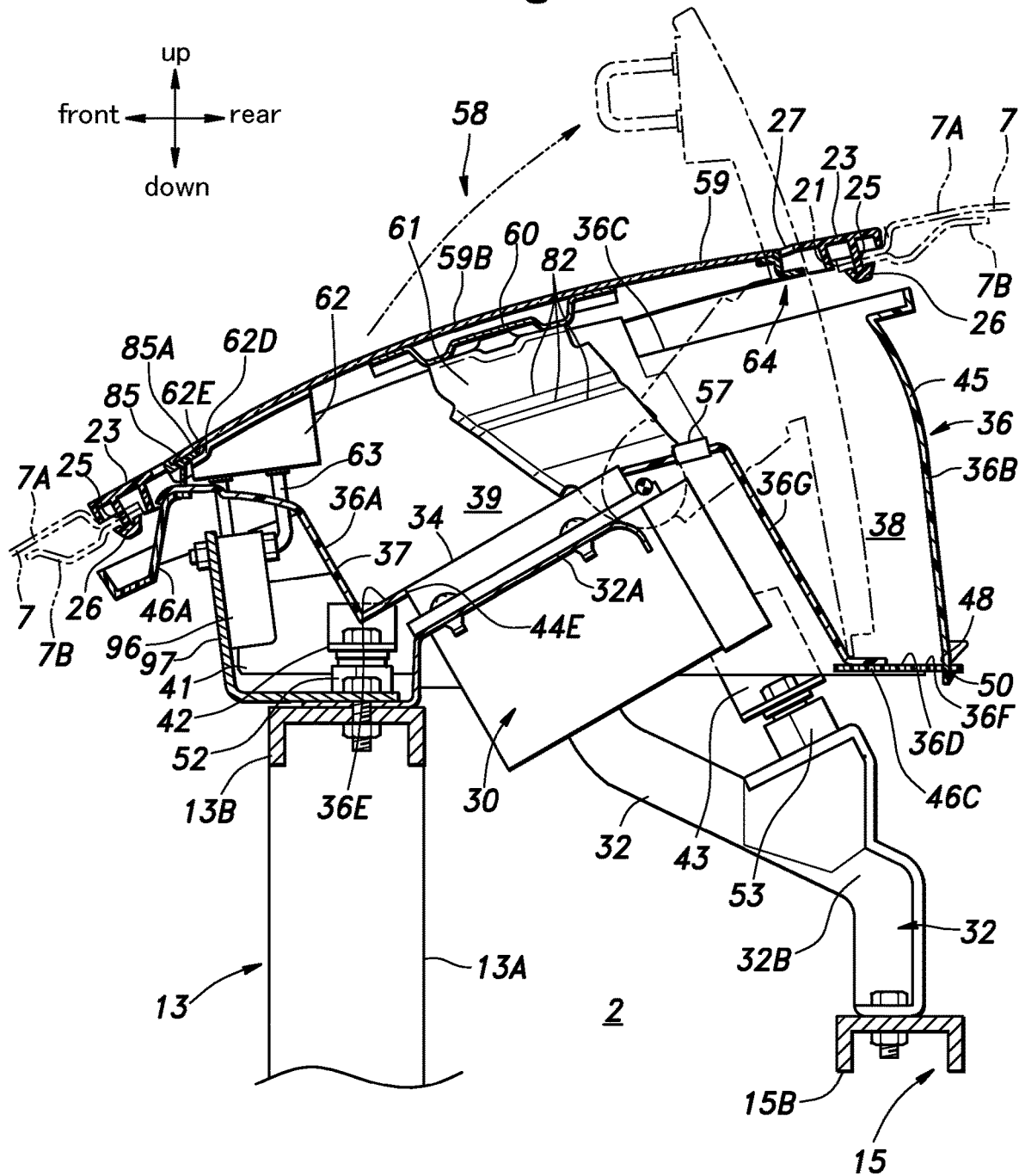
FIG. 4 is a sectional view taken along line IV-IV in FIG. 1.

A subframe 15 is provided between the left and right front side members 12. The subframe 15 consists of a rectangular frame facing vertically that includes a pair of longitudinal members 15A extending in the fore and aft direction, a front member 15B extending laterally between the front ends of the left and right longitudinal members 15A at the respective lateral ends thereof, and a rear member 15C extending laterally between the rear ends of the left and right longitudinal members 15A at the respective lateral ends thereof. Each longitudinal member 15A is connected to the corresponding front side member 12 via a connecting member 16 extending in the outboard direction from an intermediate point of the longitudinal member 15A. The subframe 15 is provided for supporting an electric unit 17 for charging and feeding electric power. The electric unit 17 may include an AC-DC converter. In addition, a drive motor (not shown in the drawings) for driving the front wheels 8 may be supported by the subframe 15. The drive motor may be positioned under the electric unit 17. The upper member 13B and the front member 15B extend in parallel to each other in the lateral direction. As shown in FIGS. 3 and 4, the front member 15B is positioned somewhat lower than the upper member 13B.

As shown in FIGS. 3 and 4, the front hood 7 has a plate-like outer panel 7A disposed on the outer side of the vehicle, and a plate-shaped inner panel 7B disposed on the back side of the outer panel 7A. The inner panel 7B includes parts functioning as beams to impart rigidity to the outer panel 7A by forming a closed cross section jointly with the outer panel. The peripheral edge of the outer panel 7A is attached to the peripheral edge of the inner panel 7B by hemming. It is preferable that the outer panel 7A and the inner panel 7B are further bonded in selected places by an adhesive agent or the like.

A port opening 21 is formed in a front part of the front hood 7 with respect to the fore and aft direction, and in a central part of the front hood 7 with respect to the lateral direction. The port opening 21 is substantially rectangular (or trapezoidal) in plan view. An edge part 22 of the outer panel 7A defining the port opening 21 is recessed downward or toward the inner panel 7B. The edge part 22 of the outer panel 7A is attached to the inner panel 7B at a plurality of locations by spot welding. It is preferable that each side of the rectangular edge part 22 is provided with at least one spot welded point. It is also possible to use laser welding or another form of welding that creates a weld seam between the outer panel 7A and the inner panel 7B. To increase the stiffness of the pat of the front hood 7 surrounding the port opening 21, the inner panel 7B is formed with an annular bead recessed downward along the periphery of the port opening 21 so as to form a closed cross section surrounding the port opening 21 jointly with the outer panel 7A.

A garnish 23 is provided on the outer surface side of the edge part 22. The garnish 23 is made of resin. The garnish 23 has a substantially rectangular frame portion 24. The frame portion 24 is disposed along the edge part 22, and covers the outer surface and the terminal edge of the edge part 22. A plurality of engagement claws 26 project from the back side (lower side) of the garnish 23, and are passed through engagement holes 25 formed in the part of the front hood 7 corresponding to the edge part 22 to fixedly secure the garnish 23 to the front hood 7. The rear side of the garnish 23 is provided with a flange portion 27 that projects forward so as to overlap with a rear end part of the port opening 21 (or to overhang over a rear end part of the port opening 21). The garnish 23 rests upon the downwardly recessed edge part 22 of the outer panel 7A so that the upper surface of the frame portion 24 of the garnish 23 is substantially flush with the upper surface of the front hood 7.

A port device 30 is supported by the vehicle body 3 so as to be located under the front hood 7. More specifically, the port device 30 is supported by a support member 32 which is fixed to the upper member 13B and the front member 15B in such a manner that the port device 30 faces the port opening 21. The support member 32 that forms a part of the vehicle body 3 is formed by combining a plurality of sheet metal members. The support member 32 includes a main portion 32A fixed to the upper member 13B at the front edge thereof, and a pair of leg portions 32B extending rearward and downward from either lateral end part of the main portion 32A. The rear ends of the leg portions 32B are fixed to the front member 15B. The main portion 32A is formed in a plate shape and is inclined so that the upper surface faces forward and upward. The main portion 32A is connected to the upper member 13B at the front edge thereof.

The port device 30 includes a port 34 (connector) that is electrically connected to the electric unit 17 by an internal cable, and an external cable can be detachably connected to the port 34. The port 34 may include at least one of a charging port and a power feeding port. The port 34 may include a single port used for charging an onboard battery and feeding electric power to an external user, or may include a charging port and a power feeding port that are provided independently from each other. The port device 30 is provided on the upper surface of the main portion 32A of the support member 32 so as to face forward and upward.

The port device 30 is received in a housing 36 that has a front wall 36A, a rear wall 36B, a left and a right side wall 36C, and a bottom wall 36D, and is thus formed in a box shape having an open top side. The housing 36 in the illustrated embodiment is made of a plurality of pieces of molded plastic as will be discussed in more detail hereinafter. The bottom wall 36D includes a front bottom wall 36E, a rear bottom wall 36F positioned lower than the front bottom wall 36E, and a vertical wall 36G positioned between the front bottom wall 36E and the rear bottom wall 36F and facing generally rearward. The rear wall 36B is connected to the rear bottom wall 36F at the rear edge thereof, and the left and right side walls 36C are connected to the rear bottom wall 36F and the vertical wall 36G at the respective lower edges thereof. The front bottom wall 36E, the rear wall 36B, and the left and right side walls 36C jointly define a port accommodating space 37 which is formed as a recess having an open top side. The rear bottom wall 36F, the vertical wall 36G, the rear wall 36B, and the left and right side walls 36C jointly define a lid receiving recess 38 formed as a recess having an open top side. The upper part of the lid receiving recess 38 is continuous with the bottom portion of the port accommodating space 37.

As shown in FIG. 3, a side plate 41 made of sheet metal is attached to the outer surface of each side wall 36C of the housing 36 in an overlying relationship, and is fastened to the side wall 36C by screws or the like. A lower edge part of a front end of each side plate 41 is connected to a first support member 42, and a lower edge part of a rear end of each side plate 41 is connected to a second support member 43. Each first support member 42 is made of sheet metal, and includes a vertical piece 42A extending vertically downward from the side plate 41, and a lateral piece 42B extending from the lower end of the vertical piece 42A in the inboard direction. There is a substantially 90 degree angle bend 42C between the vertical piece 42A and the lateral piece 42B. Each second support member 43 is also made of sheet metal, and includes a vertical piece 43A extending vertically downward from the side plate 41, and a lateral piece 43B extending from the lower end of the vertical piece 43A in the inboard direction. There is a substantially 90 degree angle bend 43C between the vertical piece 43A and the lateral piece 43B. The lateral piece 42B of each first support member 42, and the lateral piece 43B of each second support member 43 overlap with the housing in plan view or extend in the inboard direction under the housing 36.

The first support members 42 and the second support members 43 are each configured to bend and deform at the bend 42C, 43C under a downward loading in such a manner that these bends 42C and 43C form frangible parts or parts that deform in a preferential manner under a destructive loading.

Figure 6:
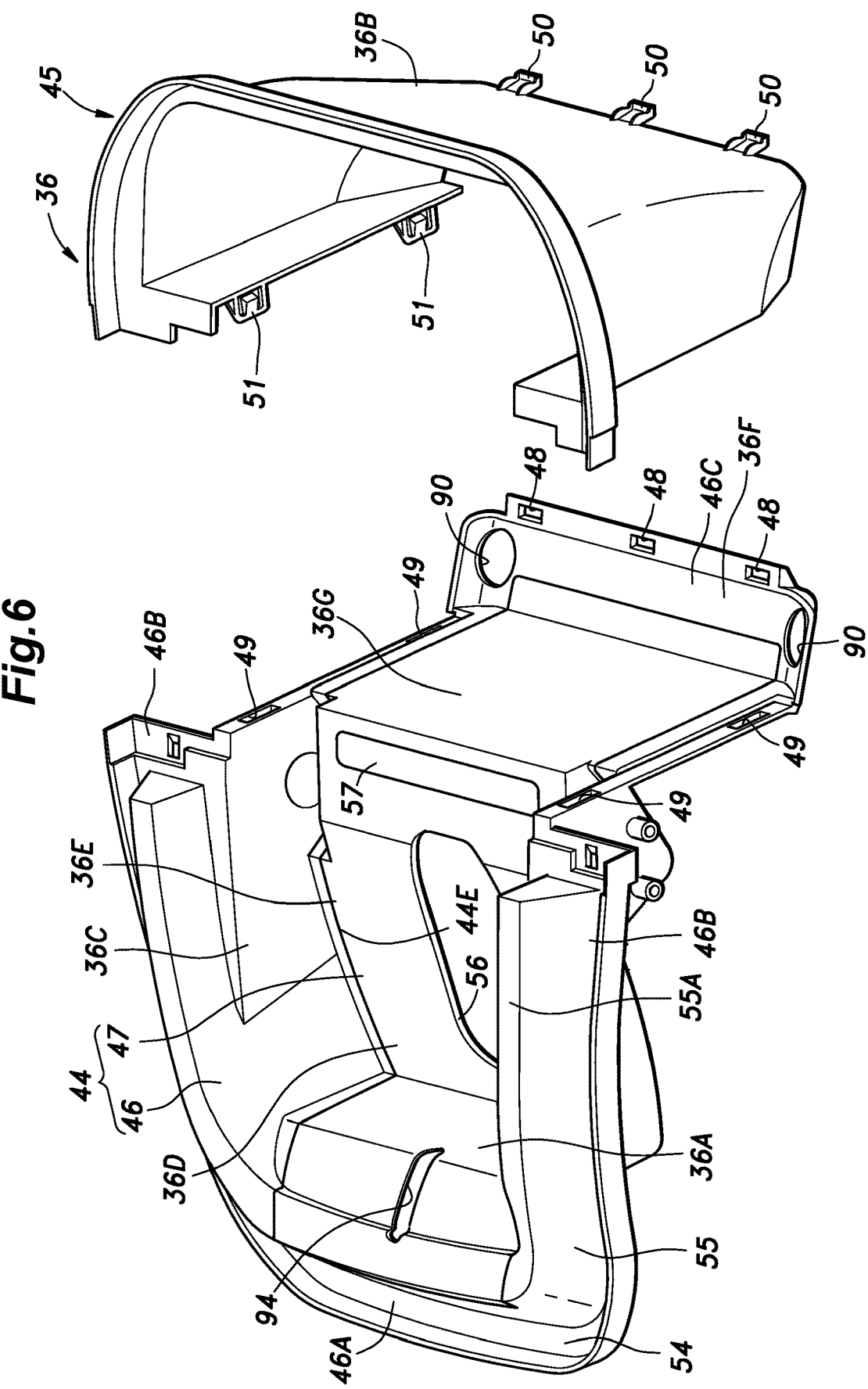
FIG. 6 is an exploded perspective view of the housing consisting of a front housing member and a rear housing member.

As best shown in FIG. 6, the housing 36 includes a front housing member 44 that forms a front part of the housing 36, and a rear housing member 45 that is detachably connected to the rear end of the front housing member 44 and forms a rear part of the housing 36. The front housing member 44 provides the front wall 36A of the housing 36, front parts of the left and right side walls 36C, and the bottom wall 36D (the front bottom wall 36E, the vertical wall 36G, and the rear bottom wall 36F). The rear housing member 45 provides the rear wall 36B and rear parts of the left and right side walls 36C.

Figure 7:
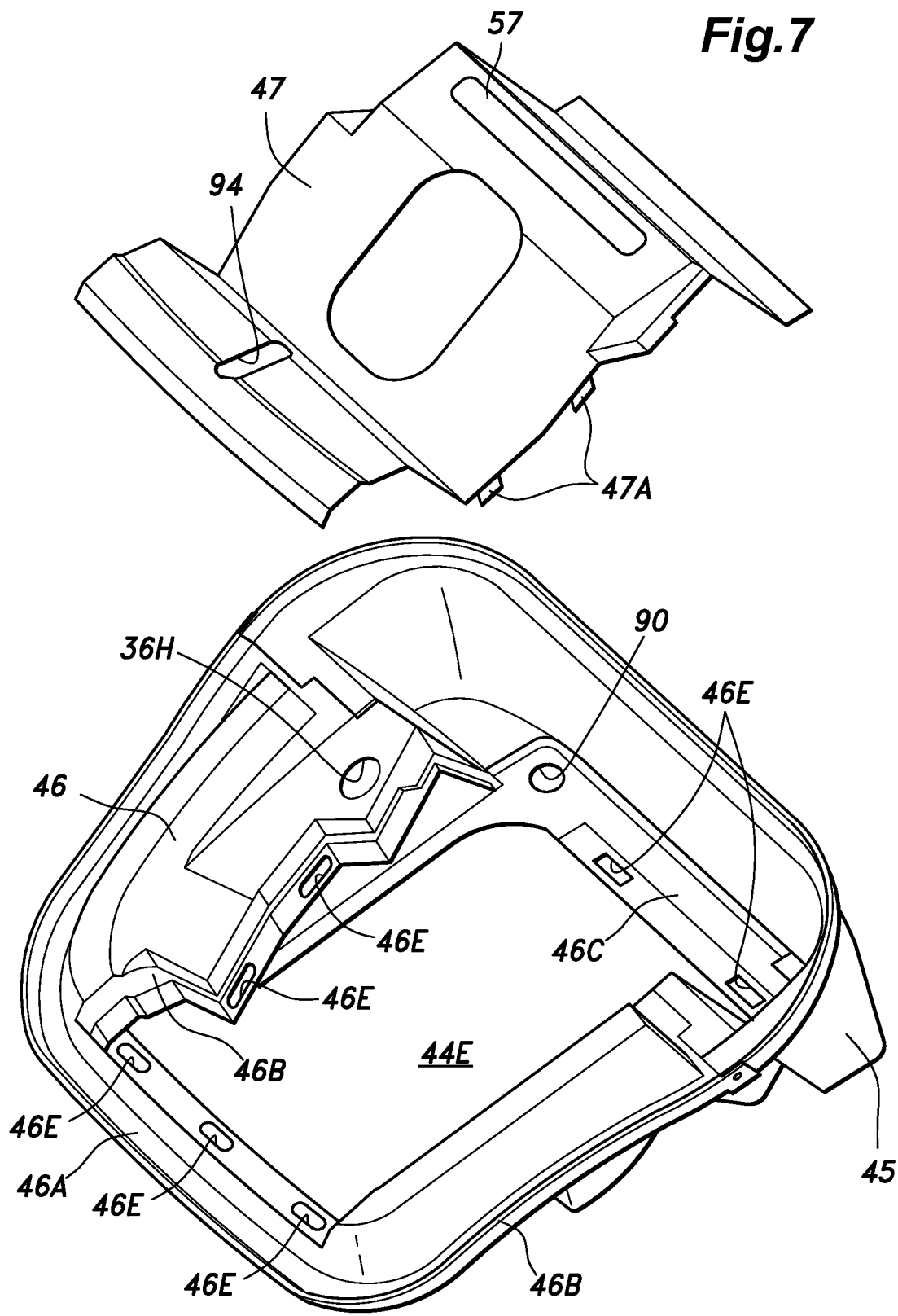
FIG. 7 is an exploded perspective view of the front housing member consisting of a first member and a second member.

As best shown in FIG. 7, the front housing member 44 includes a first member 46 and a second member 47 that are detachably connected to each other. The first member 46 includes a front edge portion 46A extending laterally, a pair of side edge portions 46B extending rearward from the respective side ends of the front edge portion 46A, and a rear edge portion 46C connected to the rear ends of the side edge portions 46B. The front housing member 44 is thus provided with a rectangular frame shape, and forms a peripheral part of the front housing member 44. The front edge portion 46A, the left and right side edge portions 46B, and the rear edge portion 46C jointly defines a front housing opening 44E. The second member 47 is disposed inside the first member 46 so as to close the front housing opening 44E. The first member 46 thus forms a front part of the front wall 36A, front parts of the left and right side walls 36C, lateral side edge parts 46B of the front bottom wall 36E, lateral side edge parts 46B of the vertical wall 36G, and a rear part of the rear bottom wall 36F. The second member 47 forms a rear part of the front wall 36A, a laterally central part of the front bottom wall 36E, a laterally central part of the vertical wall 36G, and a front part of the rear bottom wall 36F.

A plurality of connecting holes 46E are formed in an inner peripheral part of the first member 46, and connecting claws 47A are formed in the outer peripheral part of the second member 47 so as to be detachably connected to the corresponding connecting holes 46E.

The rear bottom wall 36F formed by the first member 46 is provided with first engagement holes 48 in the rear edge thereof. Each side edge of the vertical wall 36G of the first member 46 is provided with second engagement holes 49.

The rear wall 36B of the rear housing member 45 is provided with engagement pieces 50 in the lower edge thereof so as to correspond to the first engagement holes 48. The first engagement pieces 50 are each formed in a hook shape that is configured to be hooked on the edge of the corresponding first engagement hole 48. The front end of the rear part of each side wall 36C formed by the rear housing member 45 is provided with second engagement pieces 51 detachably connected to the corresponding second engagement holes 49.

In a state where the second member 47 is detached from the first member 46, the lateral pieces 42B of the first support members 42 and the lateral pieces 43B of the second support members 43 are exposed upward through the front housing opening 44E.

A front part of the front housing member 44 defines the port accommodating space 37. A rear part of the front housing member 44 and the rear housing member 45 jointly define the lid receiving recess 38. By releasing the engagement between the second engagement holes 49 and the second engagement pieces 51, the rear housing member 45 can be separated rearward from the front housing member 44, and the lid receiving recess 38 can be exposed. At this time, the first engagement pieces 50 are kept engaged by the first engagement holes 48 so that the rear housing member 45 can be rotated with respect to the front housing member 44 around the first engagement pieces 50.

As shown in FIGS. 3 and 4, a pair of left and right front adjustment nuts 52 are provided on the front edge of the main portion 32A of the support member 32, and a pair of left and right rear adjustment nuts 53 are provided on the left and right leg portions 32B of the support member 32, respectively. The lateral pieces 42B of the left and right first support members 42 are fastened to the corresponding front adjustment nuts 52 by bolts. Further, the lateral pieces 43B of the left and right second support members 43 are fastened to the corresponding rear adjustment nuts 53 by bolts. The height of the front adjustment nut 52 and the rear adjustment nut 53 can be changed in the axial direction by the rotation of the corresponding bolts that are threaded with the corresponding adjustment nuts 52 and 53. The height and the inclination angle of the housing 36 can be thus adjusted by means of the front adjustment nuts 52 and the rear adjustment nuts 53. With the second member 47 removed from the first member 46, the first support members 42 and the second support members 43 become accessible from above so that the first support members 42 and the second support members 43 can be fastened to the front adjustment nut 52 and the rear adjustment nut 53, and can be adjusted as required via the front housing opening 44E. Once the second member 47 is attached to the first member 46, the various mounting components such as the first support members 42, the second support members 43, the front adjustment nuts 52, and the rear adjustment nuts 53 can be concealed from view.

Figure 5:
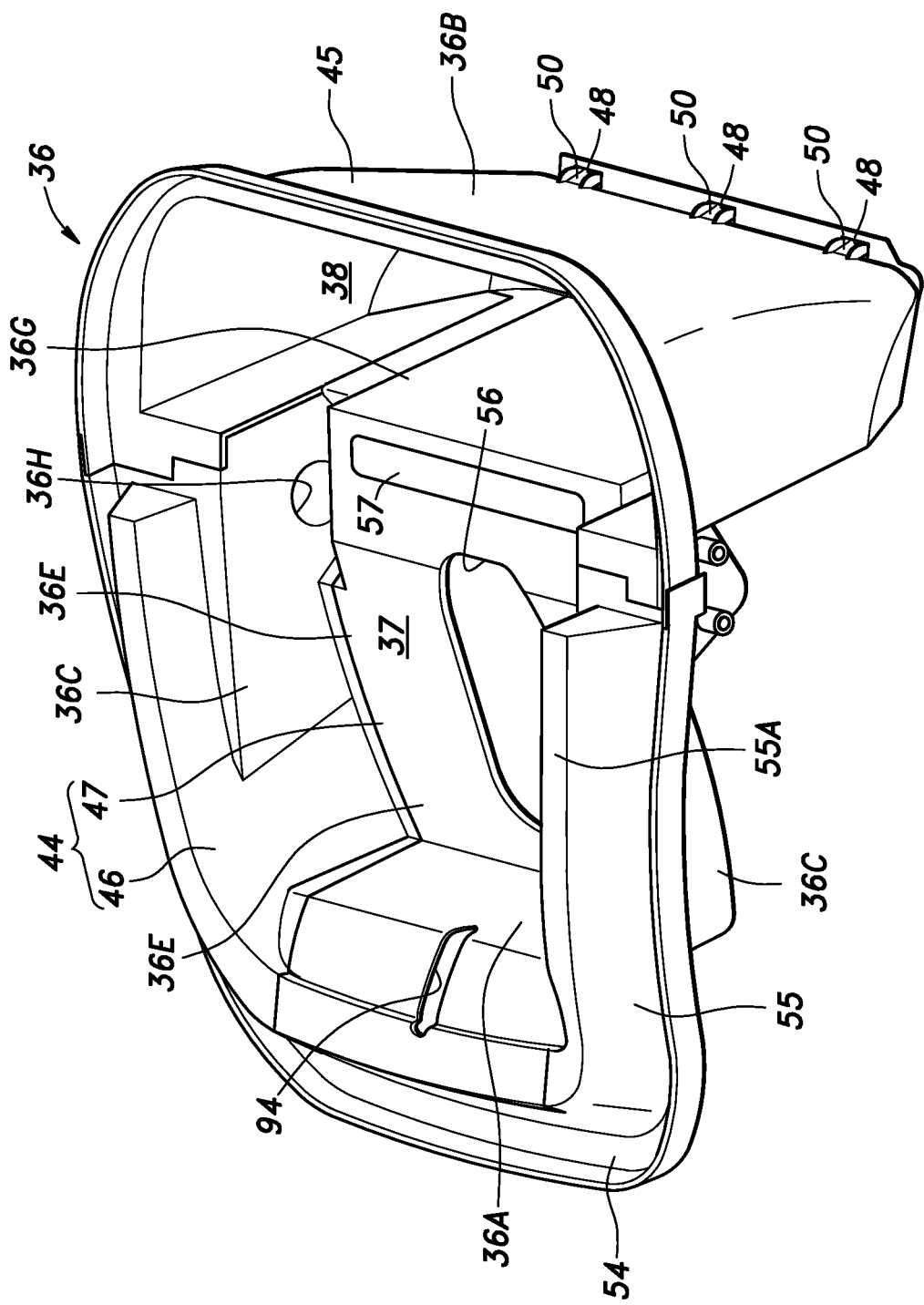
FIG. 5 is a perspective view of a housing of a port device.

As shown in FIG. 5, the housing 36 is provided with a flange 54 that extends outward from the upper edge of the front wall 36A, the rear wall 36B, and the side walls 36C. The flange 54 is formed as a substantially horizontal plate, and has a substantially rectangular frame shape in plan view. The flange 54 is provided with a rib 55 protruding upward. The rib 55 extends laterally along the front wall 36A, and extends rearward from the lateral ends thereof along the respective side walls 36C. A substantially horizontal contact surface 55A is defined on the upper end surface of the rib 55.

The front bottom wall 36E formed by the second member 47 is provided with an opening 56 passed vertically therethrough. The port device 30 provided in the main portion 32A of the support member 32 extends through the opening 56, and is received inside the housing 36. A light emitter 57 such as an LED is provided in the port accommodating space 37, in particular a rear end part of the front bottom wall 36E.

Figure 11:
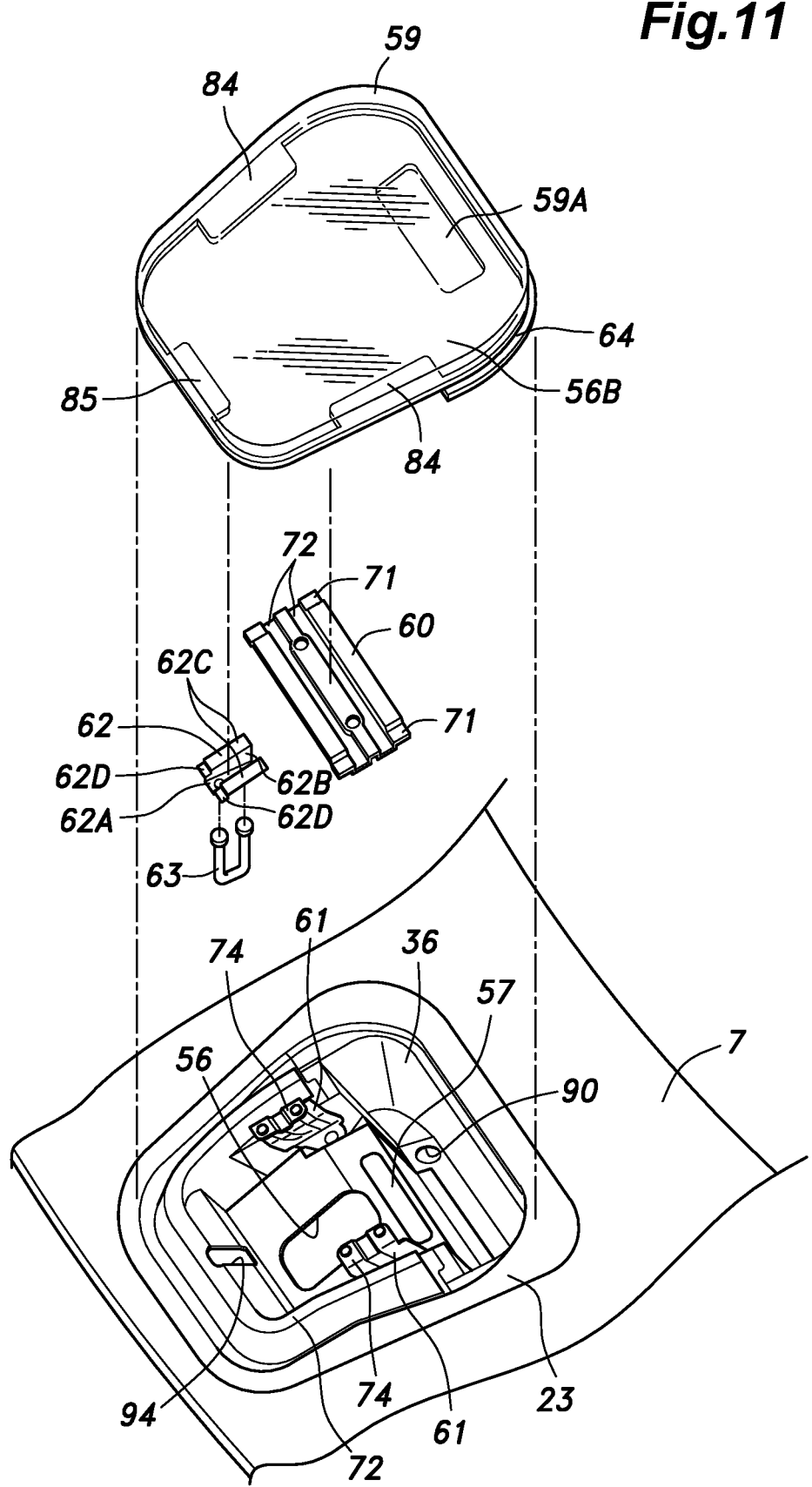
FIG. 11 is an exploded perspective view of the lid and the housing.

As shown in FIG. 4, a lid 58 that selectively closes the port opening 21 is rotatably provided in the housing 36. As shown in FIG. 11, the lid 58 includes a lid plate 59 that opens and closes the port opening 21, a reinforcing member 60 attached to the back side of the lid plate 59, and a pair of hinge arms 61 (arm members) connected to the reinforcing member 60. A striker 63 is attached to the rear side of the lid plate 59 via a bracket 62. The striker 63 is provided in a front part of the lid 58. The lid plate 59 is provided with a seal member 64 attached to the outer periphery thereof.

As shown in FIG. 3 and FIG. 4, the lid plate 59 is formed in a substantially flat plate shape. The lid plate 59 includes a bulging portion 65 bulging on the front side at the center thereof.

Figure 10:
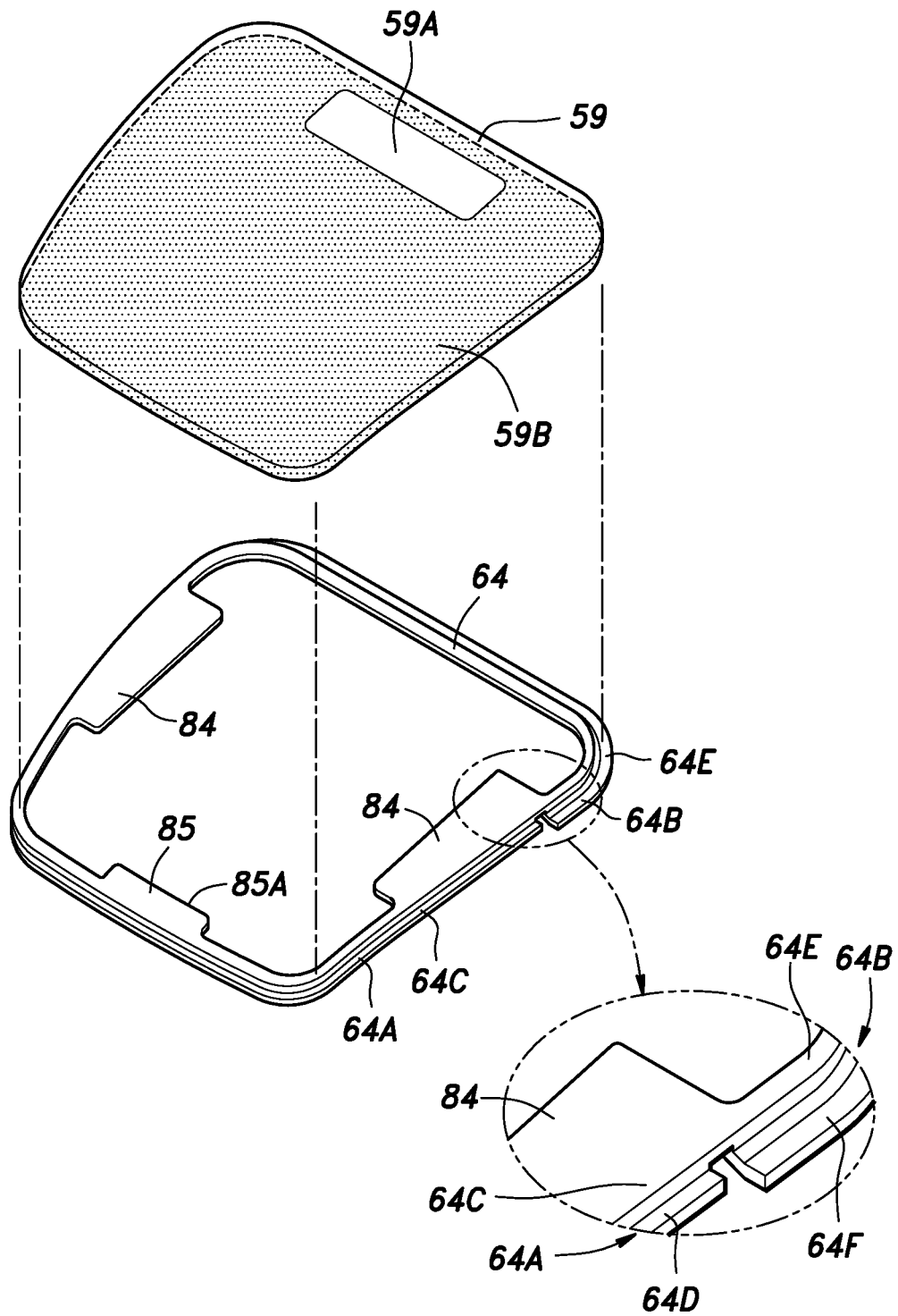
FIG. 10 is an exploded perspective view of the lid and an associated seal member.

As shown in FIG. 10, the lid plate 59 is formed of a light-transmitting material such as tempered glass, laminated glass, or resin. The lid plate 59 is provided with a translucent portion 59A having a light transmitting property and an opaque portion 59B configured to block light. Thus, the lid plate 59 is partly light transmissive. The opaque portion 59B may be formed by coating a black ceramic layer on the back surface of the lid plate 59. The light from the light emitter 57 passes through the translucent portion 59A, and can reach the outside of the lid plate 59.

Figure 9:
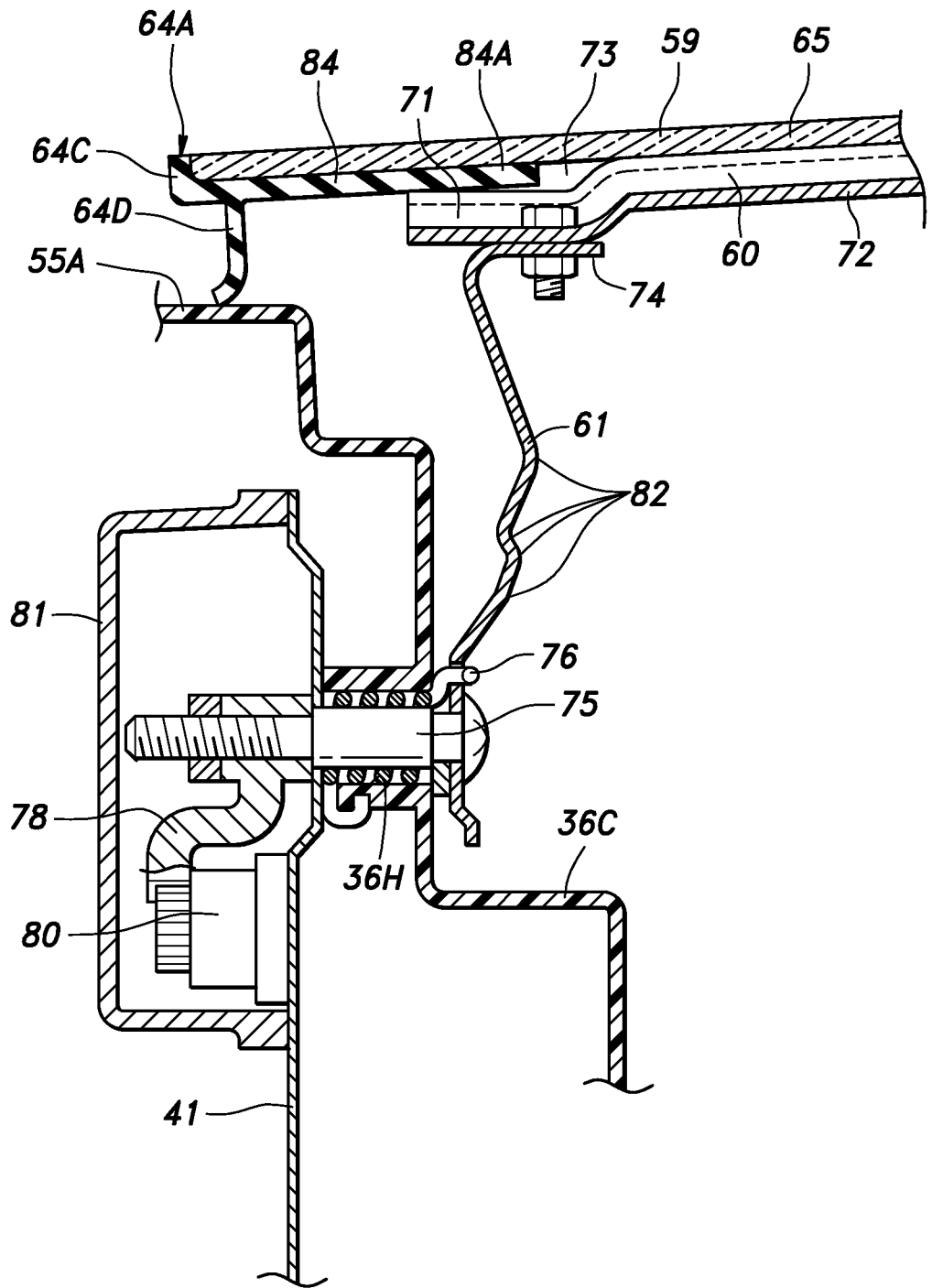
FIG. 9 is a sectional view taken along line IX-IX in FIG. 1.

As shown in FIG. 11, the reinforcing member 60 is made of a substantially rectangular sheet metal piece, and extends laterally along the back surface of the lid plate 59. The reinforcing member 60 is positioned in an intermediate part of the lid plate 59 with respect to the fore and aft direction, and is positioned and dimensioned so as to be entirely covered by the opaque portion 59B. The reinforcing member 60 may be bonded to the lid plate 59. The lateral ends of the reinforcing member 60 are provided with bent portions 71 that are bent downward in a stepwise fashion with respect to the central portion thereof. A gap 73 is therefore created between each bent portion 71 and the opposing part of the back surface of the lid plate 59 (FIG. 9). In order to increase rigidity, the reinforcing member 60 is provided with a plurality of ribs 72 extending in the lateral direction.

As shown in FIG. 9, the left and right hinge arms 61 are sheet metal members. Each hinge arm 61 extends vertically, and has a major plane facing laterally. The upper end of each hinge arm 61 is bent in the inboard direction so as to form a flange portion 74. Each hinge arm 61 is attached to the corresponding bent portion 71 of the reinforcing member 60 at the flange portion 74 thereof by a threaded bolt or the like. In another embodiment, the hinge arms 61 are formed as integral parts of the reinforcing member 60.

Each hinge arm 61 is disposed along the inner surface of the corresponding side wall 36C. The side walls 36C are each formed with a bearing hole 36H passed laterally therethrough. The lower end of each hinge arm 61 is connected to an end of a hinge shaft 75 rotatably supported by the bearing hole 36H so that the hinge arm 61 is pivotally supported by the housing 36 at the lower end. The two hinge shafts 75 extend laterally along a common hinge axis that forms the hinge axis of the lid 58. Thus, the lid 58 is supported by the housing 36 so as to be rotatable around the hinge axis.

As shown in FIGS. 1 and 4, the lid 58 can be pivoted around the hinge shafts 75 between a closed position (shown by solid lines in FIGS. 1 and 4) and an open position (shown by two-dot chain lines in FIGS. 1 and 4). In the closed position, the lid plate 59 is disposed substantially horizontally and closes the port opening 21. Further, the lid plate 59 is disposed so as to have an outer surface flush with the outer surface of the garnish 23 of the front hood 7. In the open position, the lid plate 59 is positioned rearward of the hinge shafts 75, and is disposed substantially vertically to expose the port opening 21. When the lid 58 moves from the closed position to the open position, the lid plate 59 rotates backward about the hinge shafts 75. More specifically, when viewed from the left side of the vehicle body 3, the lid plate 59 rotates clockwise around the hinge shafts 75. In the open position, a large part of the lid plate 59 is accommodated in the lid receiving recess 38, and a part thereof protrudes above the front hood 7.

As shown in FIG. 9, a biasing member 76 that biases the lid 58 to the open position is provided between each hinge arm 61 and the corresponding side wall 36C. A per se known rotary damper 80 is provided on the outer surface of the side plate 41. A gear 78 fixed to the outboard end of each hinge shaft 75 meshes with a gear fixed to the rotary shaft of the rotary damper 80. The gear 78 fixed to the hinge shaft 75 may be a sector gear, for example. The rotary damper 80 dampens the rotational movement of the hinge shaft 75. A cover 81 is attached to the outer surface of the side plate 41 to cover the outer end of the hinge shaft 75, the gear 78, and the rotary damper 80.

As shown in FIGS. 4 and 9, a frangible portion 82 is provided in a middle portion of each hinge arm 61 with respect to the lengthwise direction thereof. In this embodiment, the frangible portion 82 is a bent portion that is formed by bending the hinge arm 61 laterally in a stepwise fashion. In an alternate embodiment, the frangible portion 82 may be a portion of the hinge arm 61 that is thinner or narrower than the remaining part of the hinge arm 61. Further, the frangible portion 82 may have at least one lightening hole. The frangible portion 82 is configured to preferentially deform so as to absorb the energy of a destructive loading that may be applied to the lid plate 59 from outside.

As shown in FIG. 11, the bracket 62 is connected to the back surface of the lid plate 59 in front of the reinforcing member 60. The bracket 62 is a sheet metal member, and includes a substantially horizontal bottom wall 62A which is elongated in the fore and aft direction, a pair of side walls 62B extending upward from the outboard edges of the bottom wall 62A, and a pair of flanges 62C extending away from each other from the upper edges of the respective side walls 62B. The bracket 62 thus has a hat shape when viewed from the front. The bracket 62 is attached to the back surface of the lid plate 59 at the flanges 62C. The front part of the each flange 62C is provided with a bent portion 62D that is bent downward in a stepwise fashion with respect to the rear part thereof. A gap 62E is thus created between each bent portion 62D and the back surface of the lid plate 59. The striker 63 is connected to the bottom wall 62A, and protrudes downward from the bottom wall 62A.

As best shown in FIG. 10, the seal member 64 is made of a flexible material such as rubber and elastomer, and includes a first seal portion 64A extending along the front edge and the side edges of the lid plate 59, and a second seal portion 64B extending along the rear edge of the lid plate 59. The first seal portion 64A has a main portion 64C that extends along the front edge and the left and right side edges of the lid plate 59, and is bonded to these edges, and a lip portion 64D that protrudes downward from the main portion 64C. The lip portion 64D is provided with a high level of flexibility. The main portion 64C of the first seal portion 64A is provided with a pair of laterally extending portions 84 that extend from the positions thereof corresponding to the left and right side edges of the lid plate 59 to the center side of the lid plate 59 along the back surface of the lid plate 59. The main portion 64C of the first seal portion 64A is wrapped around the terminal edge of the lid plate 59 so as to cover the terminal edge of the lid plate 59 without protruding from the outer profile of the lid plate 59.

As shown in FIG. 9, the free end of each laterally extending portion 84 fits into the gap 73 defined between the bent portion 71 of the reinforcing member 60 and the lid plate 59. The main portion 64C of the first seal portion 64A is provided with a front extending portion 85 extending rearward from the front edge of the lid plate 59 along the back surface of the lid plate 59 to the center side of the lid plate 59. As shown in FIG. 4, the front extending portion 85 fits into the gap 62E defined between the bent portion 62D of the bracket 62 and the lid plate 59.

Figure 8:
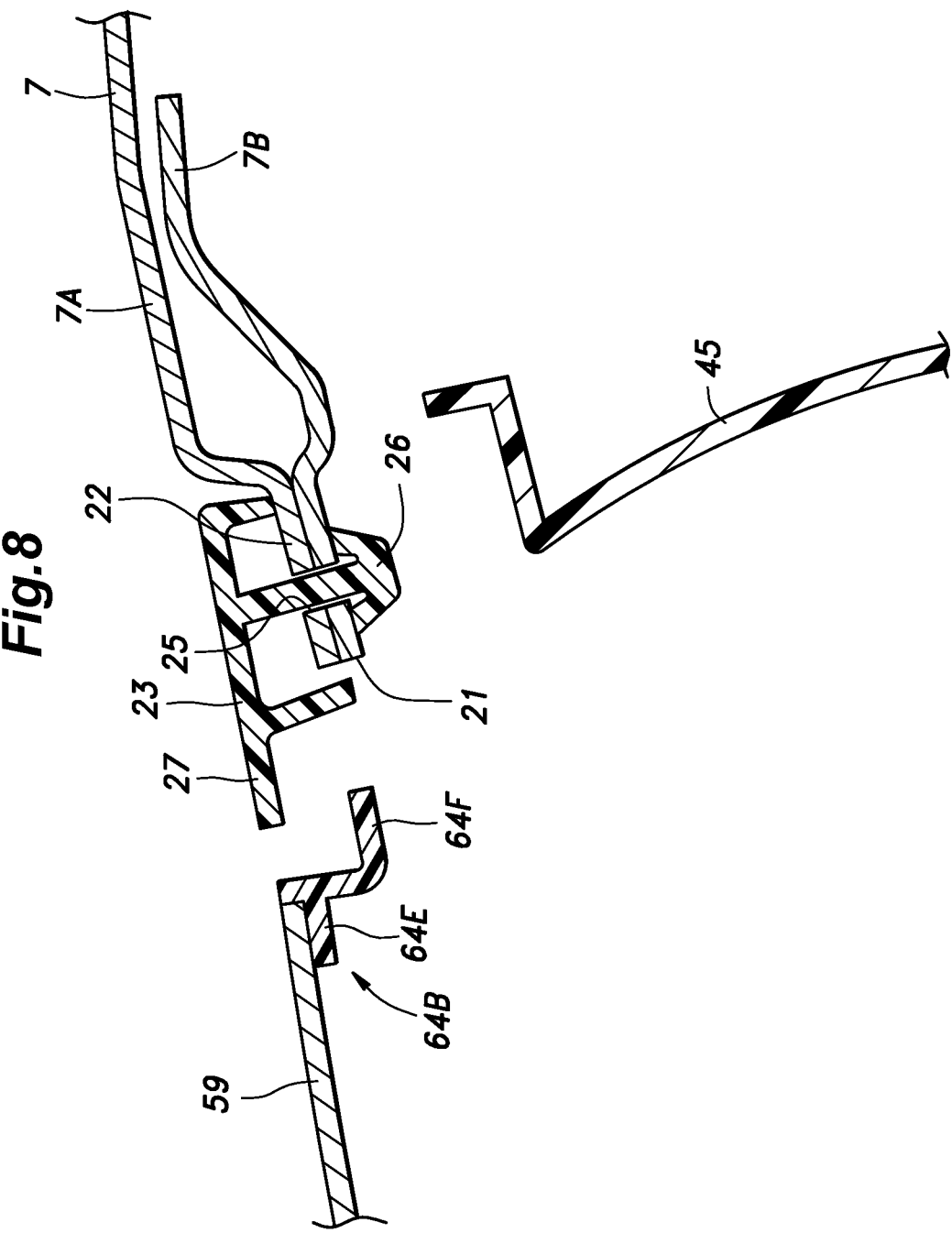
FIG. 8 is an enlarged fragmentary sectional view of a rear part of the housing.

As shown in FIG. 8, the second seal portion 64B has a main portion 64E that extends along the rear edge of the lid plate 59 and is bonded to the rear edge, and a lip portion 64F that protrudes rearward from the main portion 64E. In this case also, the main portion 64E of the second seal portion 64B is wrapped around the terminal edge of the lid plate 59 so as to cover the terminal edge of the lid plate 59 without protruding from the outer profile of the lid plate 59. When the lid 58 is in the closed position, the lip portion 64F of the second seal portion 64B extends toward the lower side of the flange portion 27 of the garnish 23, and overlaps with the flange portion 27 when viewed from above. In other words, the gap between the rear edge of the lid plate 59 and the garnish 23 is concealed by the second seal portion 64B. Preferably, the second seal portion 64B does not contact the garnish 23 or the housing 36.

As shown in FIG. 4, when the lid 58 is in the closed position, the rear edge of the lid plate 59 coincides with a part of the lid receiving recess 38 when viewed from above. As a result, moisture such as rainwater that has passed between the second seal portion 64B and the flange portion 27 of the garnish 23 falls into the lid receiving recess 38, and is prevented from coming into contact with the port device 30. The rainwater collected in the lid receiving recess 38 is guided into drain holes 90 formed in a bottom part of the lid receiving recess 38 as shown in FIG. 6, and is discharged out of the lid receiving recess 38.

In the present embodiment, the first seal portion 64A and the second seal portion 64B are continuous with each other, and jointly form an annular shape. In an alternate embodiment, the first seal portion 64A and the second seal portion 64B are made of separate pieces.

As shown in FIG. 5, a slot 94 is provided in a front portion of the housing 36, or more specifically, in a front end portion of the second member 47. A latch 96 (locking member) is attached, via a bracket 97, to a part of the upper member 13B of the bulkhead 13 located under the slot 94 so that the striker 63 that has moved into the slot 94 as the lid 58 is about to be fully closed is engaged by the latch 96. The latch 96 may be configured to release the engagement with the striker 63 by a solenoid mechanism which is controlled by a control unit not shown in the drawing.

In the vehicle body front structure 1 of the illustrated embodiment, since the port device 30 is provided on the structural member of the vehicle body 3, instead of the front hood 7, the port device 30 does not add to the weight of the front hood 7. Further, since the edge part 22 of the outer panel 7A is welded to the inner panel 7B, even though the front hood 7 is provided with the port opening 21, an adequately high stiffness of the outer panel 7A can be ensured. Moreover, since the garnish 23 covers the welded portions, a favorable external appearance of the front hood 7 can be ensured.

Also, since the hinge axis (hinge shafts 75) of the lid 58 is disposed inside the housing 36, the rear portion of the lid 58 is received in the housing 36 when the lid 58 is in the open position. Therefore, in the open state, the protrusion of the lid 58 from the front hood 7 can be minimized. Therefore, even if the vehicle should travel without properly closing the lid 58, the load that the lid 58 receives from the wind can be minimized. In particular, since the hinge arms 61 extend from the middle part of the lid 58 with respect to the fore and aft direction into a part of the housing 36 located deep inside the housing 36, the lid 58 in the open position is caused to be received in large part deep inside the housing 36 so that the accessibility to the port device 30 can be maximized.

The lateral width of the lid plate 59 is smaller in the front than in the rear (thus defining a trapezoidal shape) so that the lid 58 is favorably prevented from interfering with the garnish 23 and the housing 36 when the lid plate 59 rotates from the closed position to the open position.

When the lip portion 64D of the first seal portion 64A comes into contact with the contact surface 55A of the rib 55 of the housing 36, the front side and the lateral sides of the port device 30 are sealed. Thereby, rainwater and other foreign matters are prevented from reaching the port device 30 from these sides. Since the lid receiving recess 38 is provided in the rear portion of the port device 30, rainwater and other foreign matters that may come into the housing 36 from this side are trapped in the lid receiving recess 38, and prevented from reaching the port device 30.

Since a labyrinth seal is formed by the flange portion 27 of the garnish 23 and the lip portion 64F of the second seal portion 64B, foreign matters are favorably prevented from intruding into the housing 36. Since the second seal portion 64B is provided below the flange portion 27 of the garnish 23, the second seal portion 64B does not interfere with the flange portion 27 of the garnish 23 when the lid 58 rotates.

When an object forcibly strikes the lid 58 from the outside of the vehicle, the frangible portions 82 of the hinge arms 61 are deformed so that the impact can be absorbed, and prevented from being transmitted to other parts of the vehicle body. Furthermore, the bends 42C and 43C of the first support member 42 and the second support member 43 are also preferentially deformed so that the impact can be absorbed, and prevented from being transmitted to other parts of the vehicle body.

Since the housing 36 is formed by the front housing member 44 and the rear housing member 45 that are separable from each other, the lid receiving recess 38 can be exposed by removing the rear housing member 45 from the front housing member 44. Therefore, it is possible to recover an article that has fallen into the lid receiving recess 38.

By fitting the first engagement pieces 50 into the respective first engagement holes 48, the rear housing member 45 can be properly positioned with respect to the front housing member 44, and the rear housing member 45 can be jointed to the front housing member 44 with ease. When the rear housing member 45 is desired to be removed from the front housing member 44, since the first engagement pieces 50 are engaged by the first engagement holes 48, the rear housing member 45 can be first rotated with respect to the front housing member 44, and then the rear housing member 45 can be separated from the front housing member 44 by disengaging the first engagement pieces 50 from the respective first engagement holes 48. Thereby, the detachment of the rear housing member 45 from the front housing member 44 can be performed in a stable and reliable manner.

The front housing member 44 is formed by the first member 46 and the second member 47, and the first support members 42 and the second support members 43 that support the first member 46 to the vehicle body 3 can be exposed by removing the second member 47. Therefore, when mounting the front housing member 44 to the vehicle body 3, the first member 46 can be first attached to the vehicle body 3 via the first support members 42 and the second support members 43, and the second member 47 can be joined to the first member 46. Thereby, the assembly of the front housing member 44 to the vehicle body 3 can be facilitated, and the first support members 42, the second support members 43 and the associated fasteners can be conveniently concealed by the second member 47.

The present invention has been described in terms of a specific embodiment, but the present invention is not limited by such an embodiment, and can be modified in various ways without departing from the spirit of the present invention. For instance, the port 34 is not limited to a charging port and/or power feeding port, but may also be a fuel filling port having an inlet for filling fuel such as gasoline and hydrogen.

The invention claimed is:

1. A vehicle body front structure including a front hood provided in a front part of a vehicle body, and a port device mounted to the vehicle body and positioned under the front hood;
    wherein the front hood includes an outer panel and an inner panel attached to a back side of the outer panel, the outer panel and the inner panel defining a port opening facing the port device and passed through the outer panel and the inner panel in a thicknesswise direction thereof, and being welded to each other along a peripheral edge of the port opening; and
    wherein a garnish has a frame portion disposed along an outer surface of a peripheral part of the outer panel surrounding the port opening, the garnish covers a welded portions of the outer panel and the inner panel, and a lid for selectively closing the port opening is provided on the vehicle body,
    the vehicle body is provided with a housing having an open side facing the port opening, the port device being received in the housing, and the lid includes a lid plate for selectively closing the port opening, and a hinge arm extending from the lid plate into the housing and supported by the housing so as to be rotatable around a laterally extending hinge axis,
    the lid is configured to move from a closed position to an open position by a rearward rotation of the lid plate, and a rear part of the housing is provided with a lid receiving recess which is recessed more downward than a front part of the housing and configured to receive at least a part of the lid in the open position,
    a front bottom wall of the housing includes an opening through which the port device extends, and
    a bottom part of the lid receiving recess is formed with a drain hole passed through a bottom wall of the lid receiving recess in a thicknesswise direction.

2. The vehicle body front structure according to claim 1, wherein the lid plate has a smaller lateral width in a front part thereof than in a rear part thereof, and a frangible portion is provided in a middle portion of the hinge arm with respect to the lengthwise direction thereof.

3. The vehicle body front structure according to claim 1, wherein the housing includes a front wall extending laterally in front of the port device, and a pair of side walls extending rearward from either side edge of the front wall along either side of the port device, and wherein a front edge and side edges of the lid plate are fitted with a first seal member that projects downward therefrom so as to engage the front wall and the side walls when the lid is in the closed position.

4. The vehicle body front structure according to claim 3, wherein the garnish is provided with a flange portion projecting beyond the peripheral edge of the port opening in a part of the garnish corresponding to a rear edge of the port opening, and a rear edge of the lid plate is fitted with a second seal member that projects downward and under the flange portion so as to overlap with the flange portion as viewed from above when the lid is in the closed position.

5. The vehicle body front structure according to claim 4, wherein the first seal member and the second seal member are continuous to each other.

6. The vehicle body front structure according to claim 5, wherein the rear edge of the lid plate coincides with a part of the lid receiving recess as viewed from above when the lid is closed.

* * * * *